Oct. 3, 1961  P. G. M. FLODIN ET AL  3,002,823
PROCESS OF SEPARATING MATERIALS HAVING DIFFERENT
MOLECULAR WEIGHTS AND DIMENSIONS
Filed April 13, 1959  5 Sheets-Sheet 1
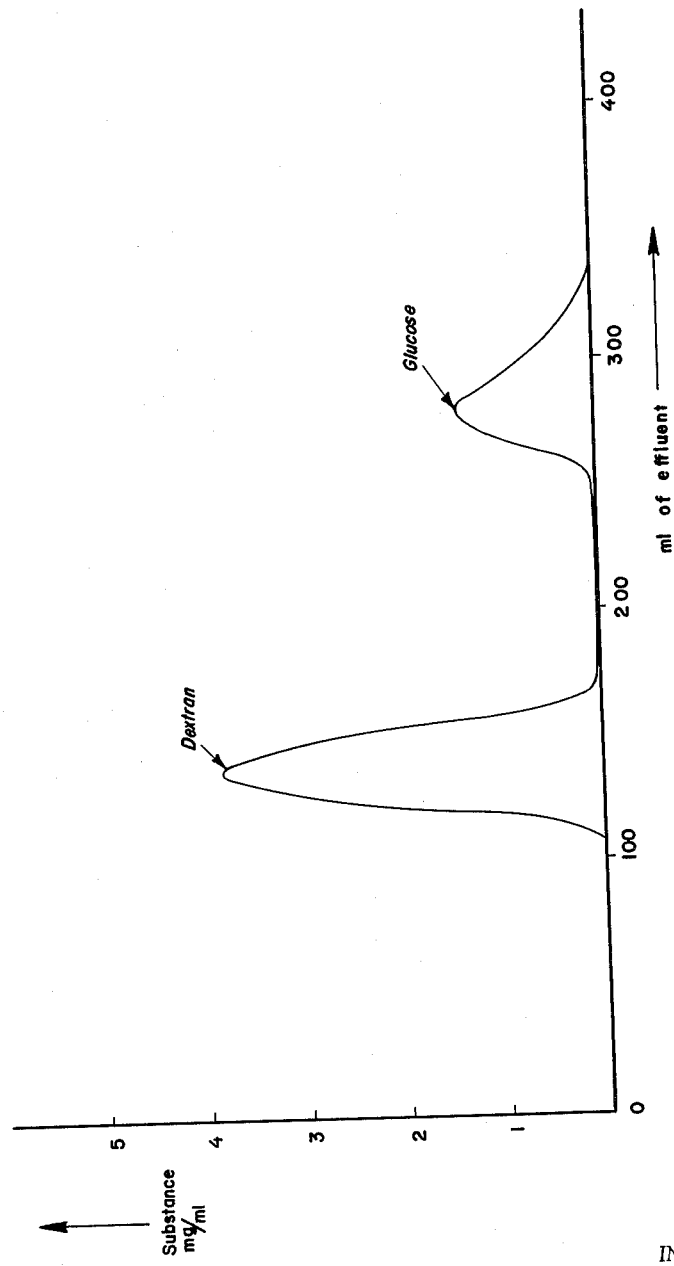
INVENTORS
Per Gustaf Magnus Flodin &
Jerker Olaf Porath
BY Estabrook + Philpitt
ATTORNEYS

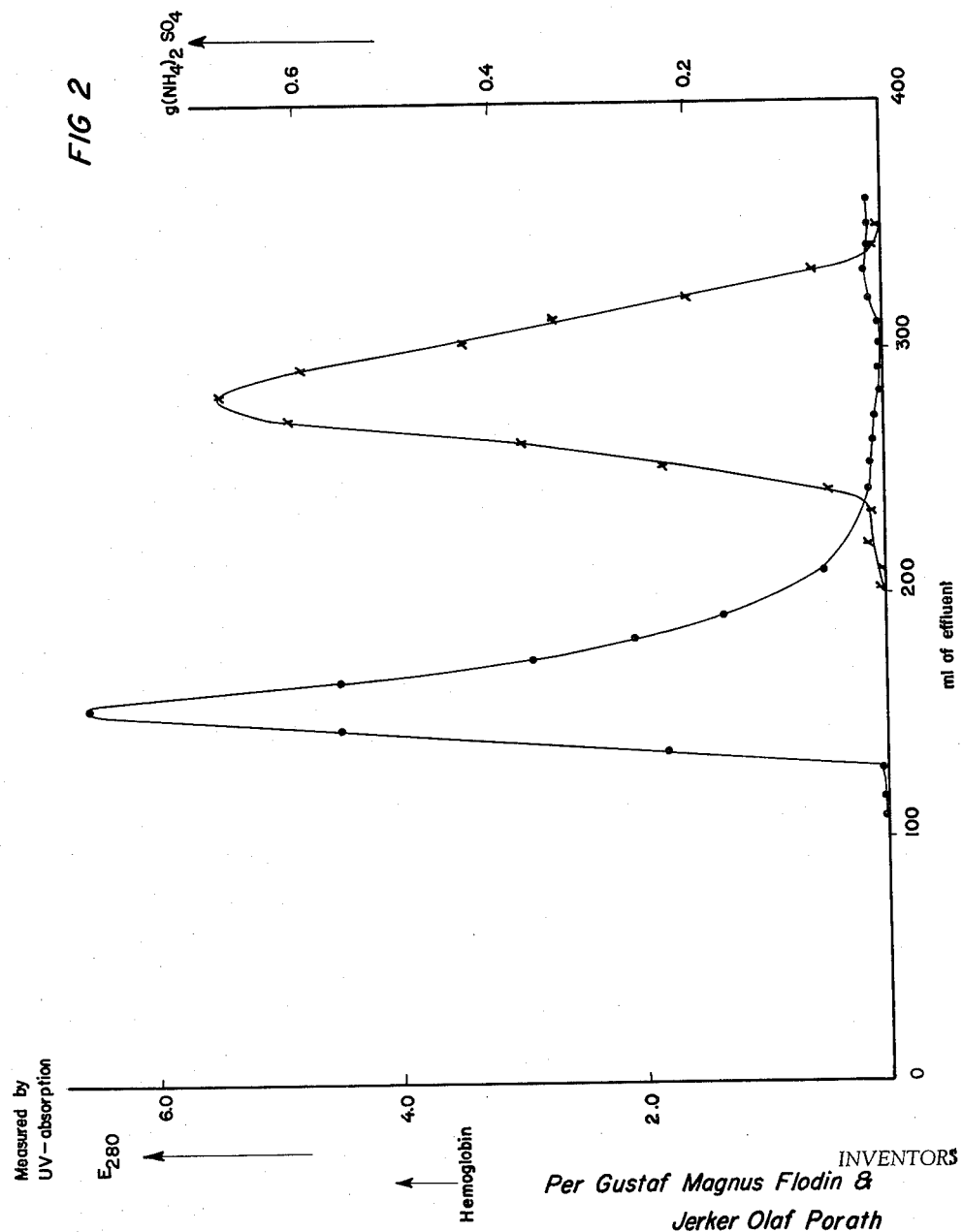

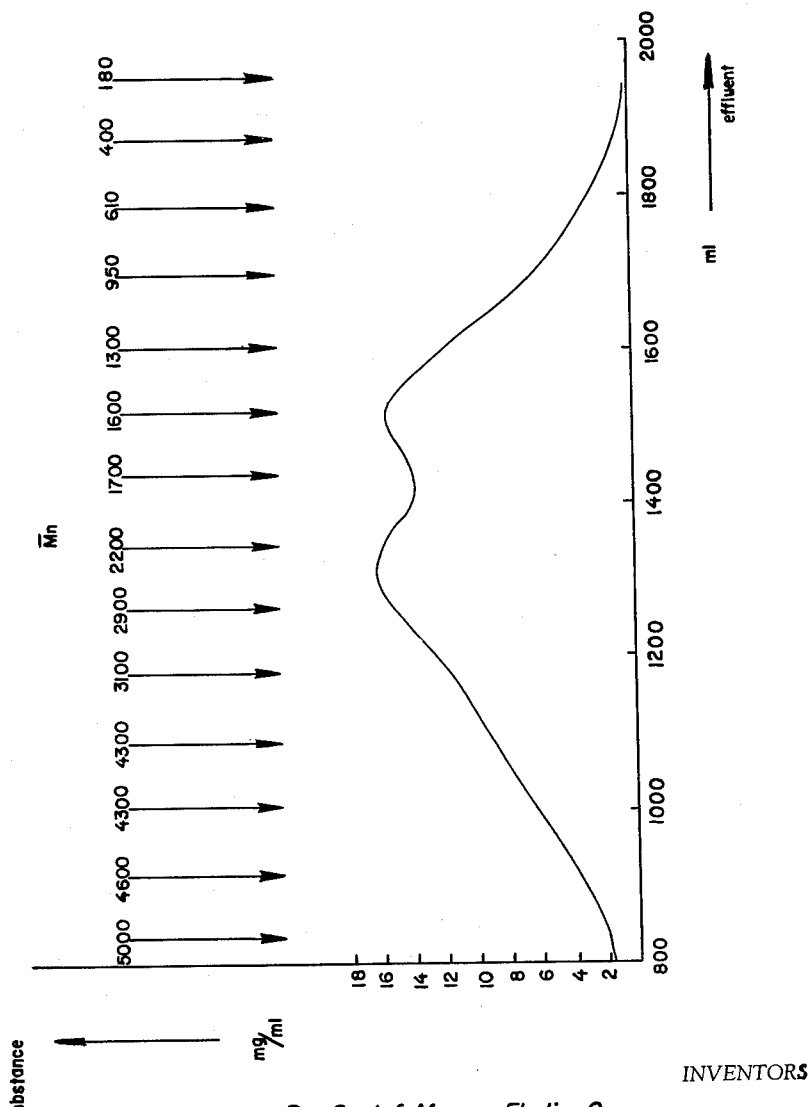

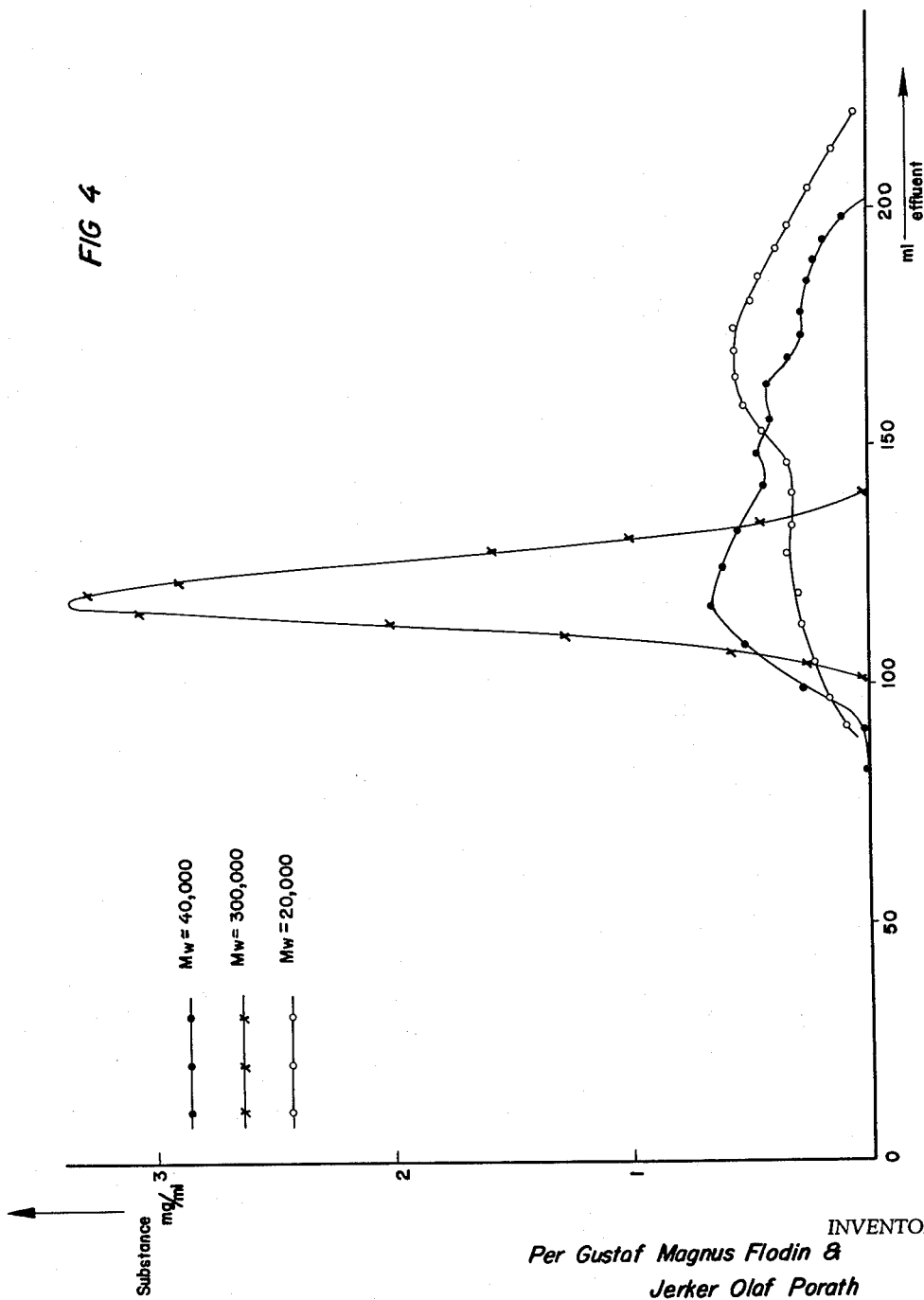

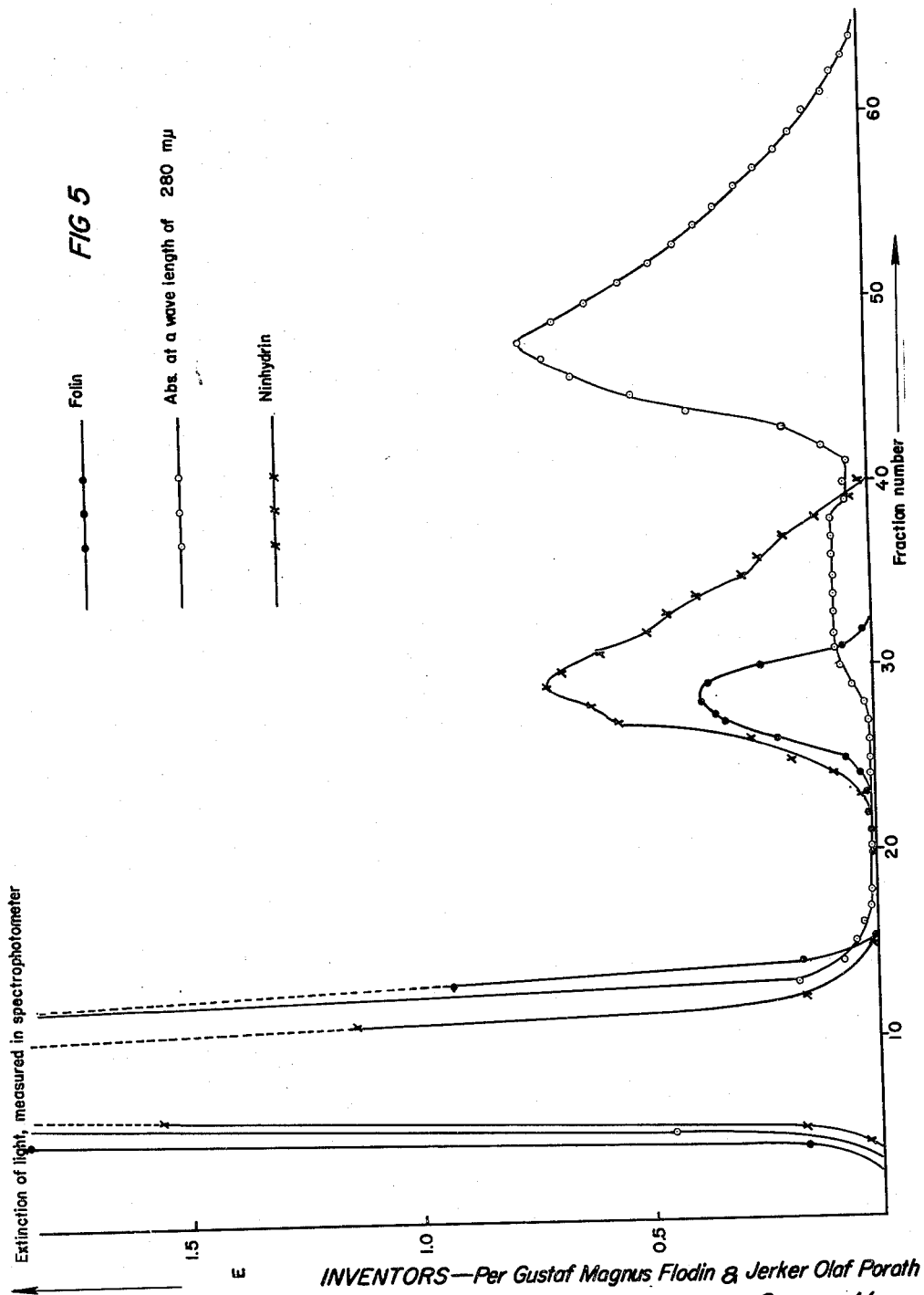

United States Patent Office 3,002,823
Patented Oct. 3, 1961

---

3,002,823
PROCESS OF SEPARATING MATERIALS HAVING DIFFERENT MOLECULAR WEIGHTS AND DIMENSIONS
Per Gustaf Magnus Flodin and Jerker Olof Porath, Uppsala, Sweden, assignors to Aktiebolaget Pharmacia, Uppsala, Sweden, a company of Sweden
Filed Apr. 13, 1959, Ser. No. 805,916
Claims priority, application Sweden Apr. 16, 1958
15 Claims. (Cl. 23—293)

INTRODUCTION

This invention generally pertains to a method for separating materials having different molecular weights (dimensions). More particularly, this invention relates to a method for separating from one another aqueous solutions of substances of different molecular weights by the aid of an uncharged granular gel material capable of selectively sorbing substances from the said solutions in accordance with their molecular weights.

BACKGROUND

There are a number of well known methods for separating mixtures of materials having different molecular weights. Such methods would include fractionation by thermal distillation, fractionation by vacuum distillation, fractionation by solvent extraction, fractionation by elutriation or fluidization, fractionation by use of ion exchange materials, etc. Although one or more of the above methods are suitable for the efficient separation of various materials, there are certain substances or mixtures of substances which are very difficult to separate by the above methods. The present invention provides a method which is both novel, efficient and economical.

OBJECTS

A prime object of this invention is to provide a novel method for separating materials having different molecular weights. A further object of this invention is to provide a novel method for treating aqueous solutions of materials of different molecular weights so as to thus separate the aqueous solution into two or more fractions of materials of different molecular weight. Another object of this invention is to provide novel separation materials for the above-mentioned separation processes.

THE INVENTION BROADLY

The method according to the present invention broadly comprises first feeding an aqueous solution of substances of different molecular weights to a bed of gel grains, the bed of gel grains being previously immersed in an aqueous medium. The gel grains consist of an uncharged water-insoluble organic material which is inert with regard to the substances to be separated and capable of swelling in aqueous medium, the said gel being capable of selectively and/or preferentially sorbing substances from the solution so that substances with different molecular weights are distributed differently between the gel grains and the surrounding solution owing to their different ability to penetrate into the gel grains, which is in turn dependent upon their molecular weights. The aqueous medium in which the gel grains are immersed is displaced from the gel bed by the said aqueous solution of different substances and thereafter aqueous liquid ("elution" liquid) is fed to the bed to displace the said aqueous solution from the bed, and successive fractions of the displaced liquid (the effluent) flowing out from the bed are collected, whereby there is obtained at least one fraction which contains a major portion of substance of larger molecular size, and at least one subsequent fraction containing a major portion of the substance of smaller molecular size.

THE COMPOSITION AND PREPARATION OF THE GEL MATERIAL

The gel materials used in the present invention comprise uncharged insoluble organic substances consisting of a three-dimensional macroscopic network of molecules bonded together by covalent linkages in the form of ether bridges of the general typt —O—X—O, wherein X represents an aliphatic radical containing from 3 to 10 carbon atoms, and having a content of hydroxyl groups corresponding to at least 12%, preferably 15% or more, of the weight of the dry gel.

Gel substances of the above-mentioned kind may be obtained by polymerisation of uncharged organic hydroxyl group-containing substances, with bifunctional organic substances contaning halogen atoms and/or epoxy groups.

As examples of suitable hydroxyl group-containing substances for this reaction may be mentioned polysaccharides (such as dextran, starch, dextrin, cellulose, polyglucose), or hydroxyl group-containing derivatives of these substances (such as ethylhydroxyethyl cellulose), or products obtained by a partial depolymerisation of the same, as well as fractions thereof, polyvinylalcohol, sugar alcohols (such as sorbitol) and carbohydrates (such as sucrose).

Examples of suitable bifunctional compounds for this reaction are epichlorohydrin, dichlorohydrin, diepoxybutan, bis-epoxypropyl ether, ethylene glycol-bis-epoxypropyl ether and 1,4-butan-diol-bis-epoxypropyl ether, and closely related compounds.

The copolymerisation of said organic hydroxyl group-containing substances with said bifunctional substances readily takes place by reacting components in aqueous solution in the presence of an alkaline reacting substance (such as an alkali metal hydroxide, alkaline earth metal oxides, tertiary and quaternary amines) as catalyst. The concentration of the organic hydroxyl group-containing substance in said aqueous solution may suitably be within the range of from about 10 to about 70% by weight. The molecular proportions of the organic hydroxyl group-containing substance to the bifunctional substance should be 1: at least 10, with the exception that in case of using sorbitol as the organic hydroxyl group-containing substance the molecular proportions should be about 1:2. The reaction time and temperature may be varied within rather wide limits, although a temperature range of about 15–90° C., preferably a range of 30–70° C., has been found most satisfactory. Depending upon the precise reaction temperature the reactants themselves, etc., the formation of a gel usually occurs in less than 4 hours. After gel formation, the gel copolymerisate is subjected to a curing step, preferably carried out at an elevated temperature within the range of about 30–90° C. and for a time generally within the range of 5–48 hours.

For example, a gel product excellently suitable for the purpose of the invention may be obtained by reacting dextran having an average molecular weight within the range of from 5,000 to 100,000 with epichlorohydrin while maintaining the reaction conditions indicated above, which results in a copolymersate consisting of a three-dimensional macroscopic network, built up of chains of mainly alpha-1,6-glycosidically bonded glucose residues bound together by ether bridges of the type $$-O-CH_2.CH(OH).CH_2-O-$$

said gel having a content of hydroxyl groups of at least 15% of the weight of the dry gel and a water regain within the range of from about 1 to 50 g./g. of the dry gel product.

Another example is a gel produced by reacting white commercial dextrin with epichlorohydrin in the same manner, which results in a copolymerisate consisting of a three-dimensional macroscopic network, built up of chains of mainly alpha-1,4-glycosidically bonded glucose residues bound together by ether bridges of the type —O—CH$_2$.CH(OH).CH$_2$—O—. This gel has a hydroxyl group content of at least 15% of the weight of the dry gel and a comparatively low water regain substantially within the range 1–20 g./g. of the dry gel product.

Similarly, a gel product of the same fundamental structure may be obtained from potato starch and epichlorohydrin, but this gel has a higher water regain within the range of 10–50 g./g. of the dry gel product.

Further, a suitable gel product may be obtained by reacting sorbitol with epichlorohydrin in the molecular proportions 1:2 but in other respects as indicated above. Hereby a copolymerisate is obtained consisting of a three-dimensional macroscopic network of sorbitol residues bonded together by ether bridges of the type

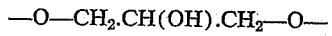

—O—CH$_2$.CH(OH).CH$_2$—O— and having a content of hydroxyl groups of about 15% of the weight of the dry gel and a water regain within the range of from about 1 to 30 and which is especially suitable for use in cases where the gel may come into contact with a liquid of a comparatively high acidity, for example, when using hydrochloric acid as a buffering substance.

The above-mentioned gel products used in the method according to the invention for preparing the gel bed are ground down to a particle size within the range of from 0.01 to 2.0 mm., for example within the range of from about 0.05 to 0.5 mm., preferably to a particle size corresponding to 20 to 200 mesh according to U.S. standard mesh.

PROPERTIES OF THE GEL MATERIAL

The gels of the present invention are insoluble in water although capable of swelling therein and due to the three-dimensional network structure of atoms bound together by covalent linkages they have a great stability and durability. Moreover, these gels are uncharged. In addition, they have a high separation capacity and it is also possible to vary this separation capacity within wide limits.

The capacity of these gel products of swelling in aqueous medium is due to the presence of the hydroxyl groups and the presence of the ether bridges. This capacity of swelling of the gel product may be expressed by the amount of water in grams which can be absorbed by 1 g. of the dry gel, which is also known as the "water regain" (WR). The water regain for the gel products used according to the invention may be within the range of from about 1 to 50 g./g. of the dry gel product, but is generally within the range of about 1.0 to 20 g./g. of the dry gel product.

The separating capacity of the gel grains is on the one hand dependent on the molecular weight of the substances to be separated and, on the other hand on the size of the pores or meshes in the three-dimensional network of the gel product. Substances present in the aqueous solution, the molecular weight of which are too large to allow a penetration into the gel grains remain in the solution and pass through the bed outside the gel grains and are collected in the first fraction or fractions, while substances of sufficiently small molecular weight to allow a penetration into the gel grains are temporarily taken up by the grains, thus enabling a separation from the molecules of greater weight and are then recovered in a subsequent fraction.

FORMING THE BED OF GEL GRAINS

The bed of the gel grains is preferably arranged in the form of a column. The apparatus may suitably consist of a cylindrical tube supported at its lower portion by a porous disc or plate, i.e., a sintered glass plate No. 1 serving as support for the gel bed and provided at its upper portion with supply arrangements for a solution of the substances of different molecular dimensions to be treated and for the elution liquid.

The gel particles, the size and water regain of which are chosen with due consideration to the separating purpose in question, should be packed in the column as tightly as possible and in such a quantity that they take up the greatest part of the total packing volume, while the remainder of the packing volume is the so-called void volume, i.e., the total volume of the spaces between the gel grains. This packing may be attained in the following manner. The calculated quantity of gel of narrow grain size distribution is allowed to swell in water until equilibrium has been reached, and it is then stirred to form a uniform suspension. This suspension is poured into the tube which has already been partly filled with water. During the packing procedure the water is allowed to flow out of the column with uniform speed. During this procedure it can be observed that the packed bed grows from the bottom upwards with a sharp upper level above which the gel grains are in constant movements by convections.

When the bed is packed, care should be taken that the upper level of the bed is as even as possible.

UTILIZING THE GEL BED FOR SEPARATION PURPOSES

Following the bed packing procedure, the water remaining in the tube above the bed is allowed to flow down through the bed until the upper level of the water is about to disappear below the top of the bed. The downward flow of water is then interrupted and the aqueous solution of substances to be separated is carefully poured as a layer on top of the bed, whereupon the flow through the bed is again started (from this time on the liquid flowing out of the column is referred to as the "effluent") until the liquid level above the bed is about to disappear in the bed.

Thereafter the elution liquid, generally water or water containing buffering substances, is poured as a layer on top of the bed and the flow through the bed again permitted to begin. The first portion of the effluent liquid consists of water until a volume substantially corresponding to the void volume of the bed has been displaced, then the larger molecules which are not capable of penetrating into the gel grains appear in the effluent and are collected in one or more fractions, and thereafter, perhaps after an interval in which the effluent consists of water, the smaller molecules which temporarily have been taken up physically in the gel grains appear in the effluent and are collected in one or more fractions, and then finally the effluent again consists of water. The bed is then again in its original state and the separation of a new amount of solution can immediately be started.

In this way it is possible to obtain fractions which contain a major portion of, or solely consist of, the substances with larger molecular weights, and other fractions which contain a major portion of, or solely consist of, the substances of smaller molecular weights.

However, in order to obtain an effective separation it is important that the volume of the aqueous solution of the substances to be separated is not supplied to the gel bed in an amount exceeding the amount (= volume) of water absorbed by the swollen gel grains. This amount of water may be expressed by the formula $a.WR$, wherein $a$ is the weight of the dry gel grains and WR is the water regain. Consequently, the said amount of aqueous solution containing the substances to be separated should be supplied to the bed in a volume no greater than $a.WR$, and preferably in a smaller volume.

Further, it is important that the rate of flow of the solution through the bed of gel grains should not be too high. It has been found that, depending on the conditions, the linear rate of flow may be as high as 10 cm./min., but it is preferably not higher than 7 cm./min.

In the above-mentioned description only an intermittent manner of operation of the apparatus has been indicated, but the process may suitably be carried out continuously stepwise in cycles, for example in the following manner. When a volume, equal to the void volume, of the fraction containing the smaller molecules is still in the column, the aqueous solution of the substances to be separated in the next cycle may be supplied to the top of the bed.

According to one mode of operation a water column is constantly maintained on top of the bed and the aqueous solution with the substances to be separated is supplied in the lower part of said water column immediately above the upper level of the bed of gel grains where it forms a layer displacing the water in the direction upwards owning to the higher density of the said aqueous solution.

Experience has shown that a bed of gel grains as described above even after employment for a considerable length of time shows no signs of degeneration.

When carrying out the process on a technical scale it may be of advantage only to effect a partial separation in each cycle and to take out only those fractions which contain a pure substance, i.e., solely one of the substances to be separated, while the other fractions, which contain a mixture of said substances, are returned to the column to be introduced therein again, together with an amount of the solution in a later cycle.

SUBSTANCES WHICH MAY BE SEPARATED

The method according to this invention may be used for separating mixtures of substances having greatly varying molecular weights, the difference in molecular weights preferably corresponding to a difference in molecular weight of at least 100. The gel to be used for the separation is chosen with regard to the purpose in question, i.e., the substances to be separated, the desired separation capacity and the flow rate through the bed of gel grains.

The present invention is especially useful for separating colloidal substances from crystalloid substancts, for example for separating salts, such as sodium chloride or ammonium sulfate, from solutions containing colloids, also labile colloids, for example colloids of biological origin, such as proteins, for example enzymes or virus. Other examples of substances which may be purified, i.e., separated from impurities of different molecular weights in this manner are inorganic colloids, colloidal pigments, dyes and aqueous dispersions of polymers produced by emulsion polymerisation processes.

The method of the present invention is especially useful for separating substances with molecular weights above 500, and particularly above 1000, since such substances are often very difficult to separate by other methods.

The present invention may also be used for fractionating a series of polymeric homologs, i.e., separating polymeric homologs of different molecular weights, for example for fractionation of water-soluble polymers, such as dextran or partially depolymerized dextran, starch and dextrins, pectin, polyethylene glycols, or derivatives of such polymers.

It may often also be of advantage to use the separating method of this invention for treating proteins or polypeptides, for example plasma proteins, enzymes (such as pepsin or a pancreas enzyme) or hormones, for example insulin, or mixtures containing polysaccharides, for example bacterial polysaccharides, such as dextran, and animal polysaccharides, for example heparin, further vitamins, antibiotics and alkaloids.

When the method of this invention is used for separating very complicated mixtures, for example solutions obtained from biological materials, it may only be possible to obtain a group separation, whereupon other methods must be used for further separation and purification.

In some cases it may be desirable to change the ion milieu for substances which are not capable of penetrating into the gel grains, in order to facilitate subsequent purification of the substance or substances in question. For example, it is possible to rapidly change the pH and ionic strength for a protein solution which is of great importance for the purification and separation of such substances. This may be effected by passing the protein solution through a gel bed in which the aqueous medium contains the buffering substances required for the change of the pH.

At this point it should be mentioned that the terms "aqueous solution," "aqueous medium" and "aqueous liquid" used in this specification and in the appended claims are intended to mean that water is the main solvent component but it may also contain a certain amount of water-soluble organic solvent, such as alcohols and ketones, for example lower aliphatic alcohols and ketones. It is also understood that the "aqueous medium" and the "aqueous liquid," respectively, may consist not only of the water-containing solvent but they may also contain a certain amount of dissolved substances, for example salts, to produce and maintain a suitable ionic strength in the liquid, or buffering substances to give a suitable pH. Examples of the former kind of substances are inorganic salts, such as sodium chloride, ammonium carbonate and ammonium sulfate, for example in 1-molar concentration, and of the latter water-soluble acetates, phosphates, borates, acetic acid, chloroacetic acids and pyridin.

EXAMPLES

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight; the temperature is room temperature, and the pressure is atmospheric, unless otherwise indicated. The weight of gel grains referred to in the examples, means dry weight of the gel grains before swelling.

*Example 1*

A tube having a diameter of 3.5 cm. and a height of 50 cm. was packed with 100 g. of waterswollen gel grains (particle size in the dry state: 100–200 mesh, U.S. standard mesh; water regain 2.6 g./g. of the dry gel, WR 2.6), produced by reaction between dextran having an average molecular weight (M) of 40,000 and epichlorohydrin. The tube was partly filled with water before supplying the gel grains to the same so that the grains were immersed in water. During the packing procedure water was allowed to flow out of the tube at a uniform speed until the upper level of the water was about to disappear below the top of the packed gel bed. The total volume of the packed gel bed was 390 ml. and the void volume was 130 ml. 5 ml. of an aqueous solution containing 10% clinical dextran ($M_w$=75,000) and 10% of glucose was then fed to the bed whereupon it was eluted with water at a rate of 84 ml./hour. The effluent liquid was collected by means of a fraction collector in successive fractions of about 7 ml., each of which were then analyzed. The first 130 ml. portion of the effluent, corresponding to the void volume, contained water. In the range between 130 and 170 ml. the effluent contained dextran and in the range between 240 and 330 the effluent contained glucose. This is illustrated graphically in FIGURE 1 of the drawings. The yield was quantitative.

*Example 2*

A tubular column having a diameter of 3.5 cm. and a height of 50 cm. was packed in the same manner as in Example 1 with 100 g. of waterswollen gel grains (particle size in the dry state: 100–200 mesh, WR 2.6), produced by reaction between dextran with an average molecular weight ($M_w$=40,000) and epichlorohydrin. An aqueous solution containing 1% of dextran ($M_w$=75,000) and 1% NaCl was fed to the bed of the gel particles. The first 130 ml. portion of the effluent liquid only contained water; the next following 200 ml. was an aqueous solution of dextran only, and thereafter a solution containing dextran as well as sodium chloride was obtained.

*Example 3*

To the same column as that employed in Example 2 was fed 15 ml. of an aqueous solution containing 0.18 g. hemoglobin and 4.5 g. ammonium sulfate. Elution was then effected with water at a rate of 66 ml./hour. In the 130 to 230 ml. fraction hemoglobin was obtained in the effluent and in the 230 to 340 ml. fraction ammonium sulfate was obtained. The yield was quantitative. The result is illustrated graphically in FIGURE 2.

*Example 4*

To the same column as in Example 2 there was fed 5 ml. of an aqueous solution containing 1% of sodium carboxymethyldextran and 1% of sodium chloride, whereupon it was eluted with water. The effluent was collected by means of fraction collectors in fractions of about 7 ml. In the fraction between 130 and 170 ml. sodium carboxymethyldextran containing a small number of chloride ions was discharged and in the 250–340 ml. fraction the effluent contained 90% of the sodium chloride without admixture of sodium carboxymethyldextran.

*Example 5*

A tubular column having a diameter of 7.2 cm. and a height of 50 cm. was packed in the same manner as in Example 1 with 300 g. of waterswollen gel grains (particle size in the dry state 50–100 mesh; WR 4.9) produced by reaction of dextran ($M_w=40,000$) with epichlorohydrin. The total volume of the bed of gel substance was 2000 ml. The void volume was 650 ml. To the bed was fed 100 ml. of a 10% aqueous solution of a dextran fraction with $M_w=4000$, whereupon it was eluted with water at a rate of 240 ml./hour. Of the effluent the first 650 ml. portion corresponding to the void volume was discarded, whereupon by means of a fraction collector 100 fractions of 17 ml. were collected. The amount of carbohydrate in each fraction was determined by reaction with anthrone. The 8th to 95th fraction contained carbohydrate. The aver. molecular weight $M_n$ (=the number average of molecular weight$\leq M_w$) was determined for every fifth fraction wherein the substance content was sufficiently large, and the following series of values was obtained: 5000, 4600, 4300, 4300, 3100, 2900, 2200, 1700, 1600, 1300, 950, 610, 400 and 180.

The result is illustrated graphically in FIGURE 3.

*Example 6*

To the same column as in Example 5 there was fed 100 ml. of an aqueous solution of colloidal ferric hydroxide (stabilized by dextran) in 1 molar copper sulfate. Elution was effected with water at a rate of 3000 ml./hour. The 650 to 1000 ml. fraction of the effluent contained the ferric hydroxide together with the dextran, and the 1600 to 2500 ml. fraction of the effluent contained the copper sulfate.

*Example 7*

A tubular column having a diameter of 2 cm. and a height of 40 cm. was packed in the same manner as in Example 1 with 7 g. of gel grains (WR 10.0); swollen in 0.1 molar sodium phosphate buffer with pH 7. The gel substance was produced by reaction between ethylhydroxyethyl-cellulose and ethylene-glycol-bis-epoxy-propyl ether. The total volume of the gel bed was 105 ml. and the void volume 38 ml. To the bed was fed 5 ml. of an aqueous solution of 60 mg. hemoglobin and 1.5 g. ammonium sulfate in a phosphate buffer, whereupon it was eluted with a phosphate buffer (0.1 molar; pH 7). After 40–55 ml. had been eluted hemoglobin in phosphate buffer appeared in the effluent and after 55–105 ml. had been eluted ammonium sulfate in phosphate buffer appeared in the effluent.

*Example 8*

A column having a diameter of 4 cm. and a height of 26 cm. was packed in the same manner as in Example 1 with 15 g. of water-swollen gel grains (WR 16.0) produced by reaction between polyvinylalcohol and epichlorohydrin. The total volume of the bed of the gel grains was 330 ml. and the void volume 120 ml. In order to ascertain to what extent it was possible to fractionate dextran, i.e. to separate polydisperse dextran substances, the distribution of 4 dextran substances was determined in 4 separate experiments. In each of said experiments 5 ml. of a 10% solution of the substance in question dissolved in water was fed to the column and elution was carried out with water at a rate of 20 ml./hour in all four experiments. The effluent liquid from the column was collected in fractions by means of a fraction collector. In the two first experiments with dextran substance of an average molecular weight of $M_w=1,800,000$ and $M_w=300,000$ respectively, the dextran appeared in the effluent after discharge of a volume of effluent corresponding to the void volume.

In the third experiment which was carried out with the dextran substance of $M_w=40,000$ the main portion of the dextran was contained in the effluent after discharge of an amount corresponding to the void volume, and a smaller portion came later. In the fourth experiment with a dextran substance of $M_w=20,000$ a minor portion of the dextran appeared in the effluent after discharge of an amount of effluent corresponding to the void volume and the main portion of the dextran came later.

The result is illustrated in FIGURE 4.

As will be seen from this experiment, it is possible by this method to separate (fractionate) such dextran substances in at least two groups, one with a molecular weight of more than 20,000–40,000 and one with a molecular weight of less than 20,000–40,000.

*Example 9*

A column having a diameter of 4 cm. was packed with 32 g. of gel grains (particle size 100–200 mesh; WR 6) produced by reacting starch with glycerine-1,3-dichlorohydrin. The total volume of the gel bed was 314 ml. Into the column was introduced 5 ml. of an aqueous solution containing 200 mg. of human serum albumin and 200 mg. of sodium chloride. The bed was eluted with water at a rate of 120 ml./hour, and 5.5 ml. fractions were collected. The albumin appeared in the eluate between 95–140 ml. and the salt in the eluate between 270 and 330 ml.

*Example 10*

A column having a diameter of 3 cm. was packed to a height of 45 cm. with swollen gel powder (particle size 200–400 mesh; WR 4.9) produced by reaction between dextran ($M_w=40,000$) and epichlorohydrin. The bed of the gel substance was washed with phosphate buffer (ionic strength 0.03; pH 7.03) until equilibrium had been reached. Then 25 ml. of fresh human serum was introduced into the bed, followed by the introduction of phosphate buffer. The effluent was collected in 7 ml. fractions by means of a fraction collector, which changed tubes every 15 minutes, thus giving a flow rate of 28 ml./hour. Protein (according to Folin-Lowry), amino acids, peptides and nucleotide material were determined in each fraction (the peptides by means of ninhydrin and the nucleotide material by U.V.-absorption). The protein was obtained in the fractions number 5–12, the peptides and the amino acids in the fractions number 20–40 and the nucleotide material in the fractions number 42–60.

The results are illustrated graphically in FIGURE 5.

Example 11

In the same bed as in Example 10, but in equilibrium with an aqueous solution of trimethylammoniumcarbonate (0.05 molar of trimethylamine; pH 8.6) 25 ml. of fresh human serum were introduced and it was then eluted with the buffer. Fractions of 7 ml. were collected every 20 minutes which amounted to a flow rate of about 21 ml./hour. The same distribution of substance in the fractions was obtained as in the previous example. By drying the fractions by freezing, preparations were obtained which were practically free from inorganic salts.

Example 12

A bed of the dimensions 7.0 x 27.5 cm. was packed with the same bed material as in Example 10 and brought into equilibrium with 0.01 molar of so-called trisbuffer [tris-(hydroxymethyl)-aminomethane-hydrochloric acid; pH=7.6]. Into the bed was introduced 100 ml. of fresh extract of rat liver obtained after the differential centrifugation at 100,000 g. The bed was eluted with the same buffer and fractions of 14 ml. were collected every 4 minutes which amounted to a flow rate of 210 ml./hour. In the fractions numbered 20–27 more than 95% of the proteins (according to the Folin method) were obtained, while the peptides were mainly obtained in the fractions numbered 28–36 and the amino acids in the fractions numbered 36–50.

Example 13

A bed of the dimensions 3 x 27.5 cm. was packed with the same bed material as in Example 10 and brought into equilibrium with a phosphate buffer (ionic strength 0.01; pH 7.08). Then 2.5 ml. of a solution of 20 ml. lysozyme and 20 mg. horse serum albumin and containing the colored protein phycocyan in phosphate buffer was fed to the bed. The same buffer was used as eluent. Phycocyan and albumin were obtained in the elution interval 48–66 ml., the lysozyme in the interval between 105 and 175 ml.

Example 14

A bed with the dimensions 3 x 22 cm. was packed with swollen gel grains (WR 4.5) produced by reacting dextran ($M_w=40,000$) and epichlorohydrin. Two experiments were made to ascertain the influence of the association degree of insulin on its sorbtion in the gel grains and its displacing and elution from the grains:

(a) The bed was brought into equilibrium with 1 molar acetate buffer (pH 3.95). Then 1 ml. of 0.51% insulin in such buffer was fed to the bed and it was eluted with the buffer. The insulin appeared in the effluent between the 55 and 65 ml. interval.

(b) The bed was brought in equilibrium with 1% dichloroacetic acid in water. 1 ml. 0.42% of insulin solution was introduced into the bed and it was eluted with the dichloroacetic acid solution. In this case the insulin was contained in the effluent between 80 and 100 ml.

Example 15

A bed with the dimensions 3.5 x 35.6 cm. was packed with gel grains (particle size 50–100 mesh; WR 3.2) produced by reaction between dextran ($M_w=40,000$) and epichlorohydrin. The bed was washed with 0.5 molar acetic acid until equilibrium had been reached. The 5 ml. of an aqueous solution of 5 mg. quinine and codeine was fed to the column and it was eluted with 0.5 molar acetic acid. Codeine and quinine passed out of the column together with a top between 250 and 360 ml.

In another experiment 5 ml. of a corresponding solution which in addition contained 25 mg. of sodium dextran sulfate ($M_w$ approximately 3000) was fed to the bed. In this case the dextran sulfate and the codeine complex passed out together in the interval between 150 and 180 ml. and quinine passed out in the interval between 270 and 350 ml.

Example 16

A bed with the dimensions 4 x 37 cm. was packed with gel grains (particle size 100–200 mesh; WR 4.2) produced by reaction between dextran ($M_w=20,000$) and epichlorohydrin. The bed was washed with 0.1 molar phosphate buffer, pH 7.0. Then 5 ml. of an aqueous solution containing 0.11% of the antibiotic substance polymyxine B was fed to the bed and thereafter 0.1 molar phosphate buffer was introduced at a rate of 101 ml./hour. The polymyxine passed out of the bed in the interval between 350 and 400 ml.

In another experiment 5 ml. of a solution containing 0.15% polymyxine and 1% sodium-dextransulfate ($M_w=1,000,000$) was fed to the bed and thereafter 0.1% phosphate buffer at a rate of 100 ml./hour. The polymyxine dextran sulphate complex passed out of the bed together with the dextran sulfate between 200 and 250 ml.

Example 17

A column having a diameter of 1.5 cm. and a height of 22 cm. was packed with waterswollen gel grains (particle size 100–200 mesh; WR 2.7) produced by copolymerisation of dextran ($M_w=40,000$) and bis-epoxypropyl ether. The total volume of the gel bed was 36 ml. Into the bed was introduced 1 ml. of an aqueous solution containing 10 mg. of human serum albumin and 100 mg. of sodium chloride. The bed was eluted with water at a rate of 95 ml. per hour, and fractions containing 3 ml. each were taken with a fraction collector. The albumin appeared in fractions 5 and 6 and the salt in fractions 8–10.

Example 18

The same column as in Example 17 was packed with gel grains (particle size 100–200 mesh; WR 1.3) produced by reacting dextrin with epichlorohydrin. The total volume of the bed was 35 ml. Into the column was introduced 1 ml. of an aqueous solution containing 10 mg. of human serum albumin and 100 mg. of sodium chloride. The bed was eluted with water at a rate of 36 ml./hour and fractions containing 3 ml. each were collected. The albumin appeared in the fractions 4–6 and the salt in the fractions 8–10.

Example 19

A column having a diameter of 1.5 cm. and a height of 22 cm. was packed with gel grains (particle size 30–100 mesh; WR 2.2) produced by reacting starch with bis-epoxypropyl ether. The total volume of the bed was 36 ml. Into the bed was introduced 1 ml. of an aqueous solution containing 10 mg. human serum albumin and 100 mg. of sodium chloride. The bed was eluted with water at a rate of 120 ml./hour and 3 ml. fractions were collected. The albumin appeared in fractions 4–6 and the salt in fractions 8–10.

Example 20

The same column as in Example 19 was packed with gel grains (particle size 50–270 mesh; WR 1.6) produced by reaction of dextran with 1,2,3,4-diepoxybutan. The total volume of the gel bed was 35 ml. Into the bed was introduced 1 ml. of an aqueous solution containing 10 mg. of human serum albumin and 100 mg. of sodium chloride. The bed was eluted with water at a rate of 7 ml./hour and fractions containing 3.5 ml. each were collected. The albumin appeared in the fractions 4 and 5 and the salt in the fractions 8–10.

Example 21

A column having a diameter of 3 cm. was packed with gel grains (particle size 100–200 mesh; WR 2.1) produced by reaction between dextran and 1,4-butandiol-diepoxypropyl ether. The total volume of the gel bed was 247 ml. Prior to the experiment the bed was washed with a 10% solution of ethanol in water. To the bed was fed 3 ml. of a solution of 30 mg. of dextran ($M_w=40,000$) and 30 mg. of glucose in 10% aqueous ethanol. It was then eluted with 10% aqueous ethanol at a rate of 180 ml./hour and the effluent was collected in 5.5 ml. fractions. Between 103 and 120 ml. the dextran appeared in the effluent and between 180 and 213 ml. the glucose.

*Example 22*

A column having a diameter of 3.5 cm. was packed with gel grains (particle size 50–100 mesh; WR 9.0) produced by reaction of sorbitol with epichlorohydrin. The volume of the bed was 219 ml. To the bed was fed 5 ml. of a solution containing 200 mg. of human serum albumin and 100 mg. of sodium chloride, whereupon it was eluted with water at a rate of 100 ml./hour. The albumin appeared in the effluent between 75 and 110 ml. and the sodium chloride between 190 and 225 ml.

MISCELLANEOUS

Those skilled in the chemical arts and particularly in the art to which this invention pertains will readily appreciate that many modifications of the basic invention set forth here are possible. For example, it is quite possible that other closely related compounds and reaction conditions might work as well as the herein specifically described compounds and reaction conditions, and there would certainly be no invention involved in trying such closely related compounds and reaction conditions in view of the present broad disclosure. All of these modifications are considered to be within the scope of the present claims by virtue of the well-established "doctrine of equivalents."

What is claimed is:

1. A method for separating from one another substances of different molecular dimensions corresponding to a difference in molecular weight of at least 100, which comprises feeding, to a bed of gel grains having an average diameter in the dry state within the range 0.01 to 2.0 mm., immersed in an aqueous medium, an aqueous solution of said substances, the said gel consisting of an uncharged insoluble organic substance inert with regard to the substances to be separated and capable of swelling in aqueous medium, the water regain of the gel being 1–50 g./g. of dry gel material, said gel consisting of a three-dimensional macroscopic network of molecules bonded together by ether bridges of the general type —O—X—O—, wherein X represents an aliphatic radical containing from 3 to 10 carbon atoms, said gel having a content of hydroxyl groups corresponding to at least 12% of the weight of the dry gel, the said aqueous solution being supplied to the bed in a maximum volume corresponding to the volume of water absorbed in the swollen gel grains, the said gel being capable of selectively sorbing substances from the solution, whereby the substances with different molecular sizes are distributed differently between the gel grains and the surrounding solution owing to their different ability to penetrate into the gel grains, dependent on their molecular dimensions, displacing liquid from the bed by the said aqueous solution, thereafter feeding aqueous elution liquid to the bed to displace a further amount of liquid from the bed, regulating the flow through the bed to a maximum rate of 10 cm./min., and collecting successive fractions of the displaced effluent liquid, whereby there is obtained a fraction of the effluent which contains a major portion of substance of larger molecular size, and a subsequent fraction of the effluent which contains a major portion of substance of smaller molecular size which has penetrated into the gel grains and temporarily been physically taken up in the gel grains.

2. The method according to claim 1, wherein the gel is a copolymerisation product obtained from a neutral polysaccharide and a bifunctional organic substance selected from the group consisting of epichlorohydrin, dichlorohydrin, diepoxybutan, bisepoxypropylether, ethylene glycol-bis-epoxypropyl ether and 1,4-butan-diol-bis-epoxypropyl ether, by reacting an aqueous solution of said components, in the presence of a alkaline reacting substance as catalyst, in the molecular proportions of about 1:at least 10 at a temperature within the range of about 15–90° C. and thereby forming a gel, and curing the gel by heating to a temperature within the range of about 30–90° C.

3. The method according to claim 1, wherein the gel is a copolymerisation product obtained from a polyvinyl alcohol and a bifunctional organic substance selected from the group consisting of epichlorohydrin, dichlorohydrin, diepoxybutan, bisepoxypropyl ether, ethylene glycol-bis-epoxypropyl ether and 1,4-butan-diol-bis-epoxypropyl ether, by reacting an aqueous solution of said components, in the presence of an alkaline reacting substance as catalyst, in the molecular proportions of about 1:at least 10 at a temperature within the range of about 15–90° C. and thereby forming a gel, and curing the gel by heating to a temperature within the range of about 30–90° C.

4. The method according to claim 1, wherein the gel is a copolymerisation product obtained from sorbitol and a bifunctional organic substance selected from the group consisting of epichlorohydrin, dichlorohydrin, diepoxybutan, bisepoxypropyl ether, ethylene glycol-bis-epoxypropyl ether and 1,4-butan-diol-bis-epoxypropyl ether, by reacting an aqueous solution of said components, in the presence of an alkaline reacting substance as catalyst, in the molecular proportions of about 1:2 at a temperature within the range of about 15–90° C. and thereby forming a gel, and curing the gel by heating to a temperature within the range of about 30–90° C.

5. The method according to claims 1 and 2, wherein the gel is a copolymerisation product obtained from dextran having average molecular weights within the range of from about 5000 to about 100,000 and epichlorohydrin, consisting of a three-dimensional macroscopic network, built up of chains of mainly alpha-1,6-glycosidically bonded glucose residues bound together by ether bridges of the type —O—$CH_2$.CH(OH).$CH_2$—O—, said gel having a content of hydroxyl groups of at least 15% of the weight of the dry gel and a water regain within the range of from about 1 to 50 g./g. of the dry gel product.

6. The method according to claim 1 and 3, wherein the gel is a copolymerisation product obtained from potato starch and epichlorohydrin, consisting of a three-dimensional macroscopic network, built up of chains of mainly alpha-1,4-glycosidically bonded glucose residues bound together by ether bridges of the type

—O—$CH_2$.CH(OH).$CH_2$—O—

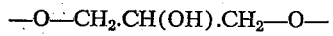

said gel having a content of hydroxyl groups of at least 15% of the weight of the dry gel and a water regain within the range of from about 10 to 50 g./g. of the dry gel product.

7. The method according to claims 1 and 4, wherein the gel is a copolymerisation product obtained from dextrin and epichlorohydrin, consisting of a three-dimensional macroscopic network, built up of chains of mainly alpha-1,4-glycosidically bonded glucose residues bound together by ether bridges of the type

—O—$CH_2$.CH(OH).$CH_2$—O—

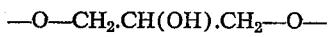

the said gel having a content of hydroxyl groups of about 15% of the weight of the dry gel and a water regain within the range of from about 1 to 20 g./g. of the dry gel product.

8. The process of claim 1, wherein the separation in carried out in the presence of a buffering substance.

9. The process of claim 1, applied for the separation of colloids from crystalloids.

10. A method for separating colloidal substances from crystalloid substances, which comprises feeding, to a bed of gel grains having an average diameter in the dry state within the range of from about 0.05 to 0.5 mm., immersed in an aqueous medium, an aqueous solution of said substances, the said gel consisting of an uncharged insoluble organic substance inert with regard to the substances to be separated and capable of swelling in aqueous medium, the water regain of the gel being 1–50 g./g. of dry gel material, said gel consisting of a three-dimensional macroscopic network of molecules bonded together by ether bridges of the general type

—O—X—O— wherein X represents an aliphatic radical containing from 3 to 10 carbon atoms, said gel having a content of hydroxyl groups corresponding to at least 15% of the weight of the dry gel, the said aqueous solution being supplied to the bed in a maximum volume corresponding to the volume of water absorbed in the swollen gel grains, the said gel being capable of selectively sorbing substances from the solution, whereby the substances with different molecular sizes are distributed differently between the gel grains and the surrounding solution owing to their different ability to penetrate into the gel grains, dependent on their molecular dimensions, displacing liquid from the bed by the said aqueous solution, thereafter feeding aqueous elution liquid to the bed to displace a further amount of liquid from the bed, regulating the flow through the bed to a rate of up to 7 cm./min., and collecting successive fractions of the displaced effluent liquid, whereby there is obtained a fraction of the effluent which contains a major portion of substance of larger molecular size, and a subsequent fraction of the effluent which contains a major portion of substance of smaller molecular size which has penetrated into the gel grains and temporarily been physically taken up in the gel grains.

11. The method of claim 10, wherein the separation is carried out in the presence of a buffering substance selected from the group consisting of water-soluble acetate, phosphate, borate, acetic acid, chloroacetic acids and pyridin.

12. The method for the separation of a mixture of polymeric homologs which comprises following the steps set forth in claim 10.

13. A method for separating from one another substances of different molecular dimensions corresponding to a difference in molecular weight of at least 100, which comprises feeding, to a bed of gel grains having an average diameter in the dry state within the range of from about 0.05 to 0.5 mm., immersed in an aqueous medium, an aqueous solution of said substances, the said gel consisting of an uncharged insoluble copolymerisation product obtained from dextran of an average molecular weight within the range of from about 5,000 to about 100,000 and epichlorohydrin, and consisting of a three-dimensional macroscopic network, built up of chains of mainly alpha-1,6-glycosidically bonded glucose residues bound together by ether bridges of the type

—O—CH$_2$.CH(OH).CH$_2$—O— said gel having a content of hydroxyl groups of at least 15% of the weight of the dry gel and a water regain within the range of from about 1 to 50 g./g. of the dry gel product, the said aqueous solution being supplied to the bed in a maximum volume corresponding to the volume of water absorbed in the swollen gel grains, the said gel being capable of selectively sorbing substances from the solution, whereby the substances with different molecular sizes are distributed differently between the gel grains and the surrounding solution owing to their different ability to penetrate into the gel grains, dependent on their molecular dimensions, displacing liquid from the bed by the said aqueous solution, thereafter feeding aqueous elution liquid to the bed to displace a further amount of liquid from the bed, regulating the flow through the bed to a rate of up to 7 cm./min., and collecting successive fractions of the displaced effluent liquid whereby there is obtained a fraction of the effluent which contains a major portion of substance of larger molecular size, and a subsequent fraction of the effluent which contains a major portion of substance of smaller molecular size which has penetrated into the gel grains and temporarily been physically taken up in the gel grains.

14. The method according to claim 13, wherein the elution liquid is an aqueous liquid containing a buffering substance.

15. The method according to claim 13, wherein the separation is carried out in the presence of an inorganic salt in at most 1-molar concentration.

References Cited in the file of this patent

UNITED STATES PATENTS

| | | |
|---|---|---|
| 2,684,331 | Bauman | July 20, 1954 |
| 2,911,362 | Wheaton | Nov. 3, 1959 |

OTHER REFERENCES

Journal of American Chemical Society, vol. 78, Feb. 20, 1956, pages 751–763.